US009066240B2

(12) United States Patent
Sadek et al.

(10) Patent No.: US 9,066,240 B2
(45) Date of Patent: Jun. 23, 2015

(54) DISCONTINUOUS RECEPTION (DRX) BASED MECHANISMS FOR CONNECTION SETUP

(71) Applicants: Ahmed K. Sadek, San Diego, CA (US);
Pranav Dayal, San Diego, CA (US);
Ashok Mantravadi, San Diego, CA (US)

(72) Inventors: Ahmed K. Sadek, San Diego, CA (US);
Pranav Dayal, San Diego, CA (US);
Ashok Mantravadi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 191 days.

(21) Appl. No.: 13/629,344

(22) Filed: Sep. 27, 2012

(65) Prior Publication Data

US 2013/0083712 A1 Apr. 4, 2013

Related U.S. Application Data

(60) Provisional application No. 61/542,048, filed on Sep. 30, 2011.

(51) Int. Cl.
*H04W 52/02* (2009.01)
*H04W 16/14* (2009.01)
*H04W 72/08* (2009.01)
*H04W 74/08* (2009.01)
*H04W 76/04* (2009.01)

(52) U.S. Cl.
CPC ............ *H04W 16/14* (2013.01); *H04W 72/082* (2013.01); *H04W 52/0238* (2013.01); *H04W 74/085* (2013.01); *H04W 76/048* (2013.01)

(58) Field of Classification Search
USPC .......... 370/252, 311, 331–336; 455/41.2, 450
See application file for complete search history.

(56) References Cited

U.S. PATENT DOCUMENTS

| 8,514,798 | B2* | 8/2013 | Lee et al. ...................... 370/329 |
| 8,711,745 | B2* | 4/2014 | Cai ................................ 370/311 |
| 8,837,313 | B2* | 9/2014 | Adachi et al. ................. 370/252 |
| 2007/0291673 | A1* | 12/2007 | Demirhan et al. ............ 370/311 |
| 2008/0127223 | A1 | 5/2008 | Zechlin |
| 2008/0267105 | A1* | 10/2008 | Wang et al. ................... 370/311 |

(Continued)

FOREIGN PATENT DOCUMENTS

WO 12057590 A2 5/2012

OTHER PUBLICATIONS

"3rd Generation Partnership Project; Technical Specification Group Radio Access Network; Evolved Universal Terrestrial Radio Access (E-UTRA); Study on signaling and procedure for interference avoidance for in-device coexistence (Release 11)", 3GPP Standard; 3GPP TR 36.816, 3RD Generation Partnership Project (3GPP), Mobile Competence Centre ; 650, Route Des Lucioles ; F-06921 Sophia-Antipolis Cedex ; France, A vol. RAN WG2, No. V11.0.0, Jun. 24, 2011, pp. 1-40, XP050553600.

(Continued)

*Primary Examiner* — Edan Orgad
*Assistant Examiner* — Steven Willmore
(74) *Attorney, Agent, or Firm* — Seyfarth Shaw LLP

(57) ABSTRACT

A user equipment (UE) may detect a potential collision between a discontinuous reception (DRX) pattern of a first radio access technology (RAT) and a reception time of a message from a second RAT of a remote device. The reception time may be unknown. The UE may dynamically reconfigure the DRX pattern to reduce a likelihood of the potential collision. The UE may also configure transmission of a different message by the second RAT during a DRX off-period to reduce a likelihood of the potential collision.

24 Claims, 16 Drawing Sheets

(56) References Cited

U.S. PATENT DOCUMENTS

| | | | |
|---|---|---|---|
| 2009/0073907 A1* | 3/2009 | Cai | 370/311 |
| 2009/0122736 A1* | 5/2009 | Damnjanovic et al. | 370/311 |
| 2009/0219904 A1 | 9/2009 | Khairmode et al. | |
| 2009/0310503 A1* | 12/2009 | Tenny et al. | 370/252 |
| 2010/0046496 A1 | 2/2010 | Hall | |
| 2010/0091693 A1* | 4/2010 | Pelletier et al. | 370/311 |
| 2010/0130214 A1* | 5/2010 | Ahluwalia | 455/450 |
| 2010/0309798 A1* | 12/2010 | Fodor et al. | 370/252 |
| 2011/0116427 A1* | 5/2011 | Chang et al. | 370/311 |
| 2011/0207490 A1* | 8/2011 | Lee et al. | 455/509 |
| 2011/0312288 A1 | 12/2011 | Fu et al. | |
| 2012/0082140 A1* | 4/2012 | Lin et al. | 370/336 |
| 2012/0087341 A1* | 4/2012 | Jang et al. | 370/331 |
| 2012/0120843 A1* | 5/2012 | Anderson et al. | 370/253 |
| 2012/0164948 A1* | 6/2012 | Narasimha et al. | 455/63.1 |
| 2012/0190302 A1* | 7/2012 | Reunamaki et al. | 455/41.2 |
| 2012/0207040 A1* | 8/2012 | Comsa et al. | 370/252 |
| 2012/0230238 A1* | 9/2012 | Dalsgaard et al. | 370/311 |
| 2012/0275366 A1* | 11/2012 | Anderson et al. | 370/311 |
| 2012/0320810 A1* | 12/2012 | Nourbakhsh | 370/311 |
| 2013/0044674 A1* | 2/2013 | Teyeb et al. | 370/315 |
| 2013/0065525 A1* | 3/2013 | Kiukkonen et al. | 455/41.2 |
| 2013/0208641 A1* | 8/2013 | Baghel et al. | 370/311 |

OTHER PUBLICATIONS

Intel Corporation: "Analysis of DRX based Solutions for in-device coexistence", 3GPP Draft; R2-112188, 3RD Generation Partnership Project (3GPP), Mobile Competence Centre ; 650, Route Des Lucioles; F-06921 Sophia Antipolis Cedex ; France, vol. Ran WG2, no. Shanghai, China; 20110411, Apr. 5, 2011, XP050494570, [retrieved on Apr. 5, 2011].

International Search Report and Written Opinion—PCT/US2012/057912—ISA/EPO—Jan. 8, 2013.

Mediatek: "Analysis in Potential TDM Coexistence Solutions", 3GPP Draft; R2-105449 Potential TDM Solutions, 3RD Generation Partnership Project (3GPP), Mobile Competence Centre ; 650, Route Des Lucioles ; F-06921 Sophia-Antipolis Cedex ; France, vol. Ran WG2, no. Xi'an; 20101011, Oct. 5, 2010, XP050452605, [retrieved on Oct. 5, 2010].

Qualcomm Incorporated: "LTE Autonomous Denials forr ISM Connection-Setup Events", 3GPP Draft; R2-114440 LTE Autonomous Denials for ISM Connection Setup, 3RD Generation Partnership Project (3GPP) , Mobile Competence Centre ; 650, Route Des Lucioles ; F-06921 Sophia Antipolis Cedex; France, vol. Ran WG2, no. Athens, Greece; 20110822, Aug. 16, 2011, XP050540111, [Retrieved on Aug. 16, 2011].

Research in Motion UK Limited: Enhancement of Variable DRX based operation for TDM solutions', 3GPP Draft; R2-113879, 3RD Generation Partnership Project (3GPP) , Mobile Competence Centre ;.650, Route Des Lucioles ; F-06921 Sophia-Anti Polis Cedex; France, vol . Ran WG2, no. Athens, Greece; 20110822, Aug. 15, 2011, XP050539667, [Retrieved on Aug. 15, 2011].

* cited by examiner

DISCONTINUOUS RECEPTION (DRX) BASED MECHANISMS FOR CONNECTION SETUP

CROSS REFERENCE TO RELATED APPLICATION

This application claims the benefit under 35 U.S.C. §119(e) to U.S. Provisional Patent Application No. 61/542,048 entitled DISCONTINUOUS RECEPTION (DRX) BASED MECHANISMS FOR CONNECTION SETUP, filed on Sep. 30, 2011, the disclosure of which is expressly incorporated by reference herein in its entirety.

BACKGROUND

1. Field

Aspects of the present disclosure relate generally to multi-radio techniques and, more specifically, to coexistence techniques for multi-radio devices.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

A method for wireless communication is offered. The method includes identifying a potential collision between a discontinuous reception (DRX) pattern of a first radio access technology (RAT) and a reception time of a message from a second RAT of a remote device. The method also includes dynamically reconfiguring the DRX pattern to reduce a likelihood of the potential collision.

An apparatus for wireless communication is offered. The apparatus includes means for identifying a potential collision between a discontinuous reception (DRX) pattern of a first RAT and a reception time of a message from a second RAT of a remote device. The apparatus also includes means for dynamically reconfiguring the DRX pattern to reduce a likelihood of the potential collision.

A computer program product for wireless communication in a wireless network is offered. The non-transitory computer-readable medium includes non-transitory program code recorded thereon. The program code includes program code to identify a potential collision between a discontinuous reception (DRX) pattern of a first RAT and a reception time of a message from a second RAT of a remote device. The program code also includes program code to dynamically reconfigure the DRX pattern to reduce a likelihood of the potential collision.

An apparatus for wireless communication is offered. The apparatus includes a memory and a processor(s) coupled to the memory. The processor(s) is configured to identify a potential collision between a discontinuous reception (DRX) pattern of a first RAT and a reception time of a message from a second RAT of a remote device. The processor(s) is also configured to dynamically reconfigure the DRX pattern to reduce a likelihood of the potential collision.

A method for wireless communication is offered. The method includes identifying a potential collision between a discontinuous reception (DRX) pattern of a first RAT and an unknown reception time of a second message from a second RAT of a remote device. The method also includes configuring transmission of a first message by the second RAT during a DRX OFF-period of the DRX pattern to reduce a likelihood of the potential collision.

An apparatus for wireless communication is offered. The apparatus includes means for identifying a potential collision between a discontinuous reception (DRX) pattern of a first RAT and an unknown reception time of a second message from a second RAT of a remote device. The apparatus also includes means for configuring transmission of a first message by the second RAT during a DRX OFF-period of the DRX pattern to reduce a likelihood of the potential collision.

A computer program product for wireless communication in a wireless network is offered. The non-transitory computer-readable medium includes non-transitory program code recorded thereon. The program code includes program code to identify a potential collision between a discontinuous reception (DRX) pattern of a first RAT and an unknown reception time of a second message from a second RAT of a remote device. The program code also includes program code to configure transmission of a first message by the second RAT during a DRX OFF-period of the DRX pattern to reduce a likelihood of the potential collision.

An apparatus for wireless communication is offered. The apparatus includes a memory and a processor(s) coupled to the memory. The processor(s) is configured to identify a potential collision between a discontinuous reception (DRX) pattern of a first RAT and an unknown reception time of a second message from a second RAT of a remote device. The processor(s) is also configured to configure transmission of a first message by the second RAT during a DRX OFF-period of the DRX pattern to reduce a likelihood of the potential collision.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
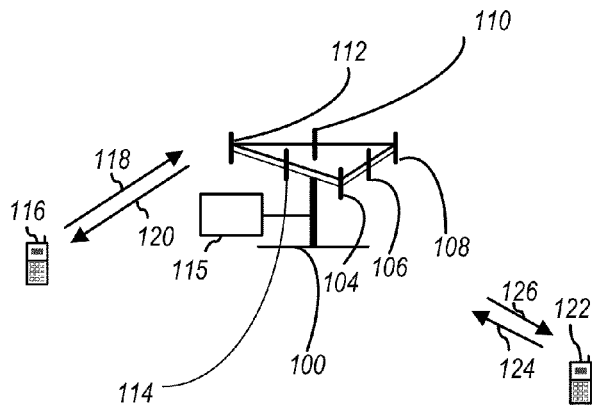
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio.

The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
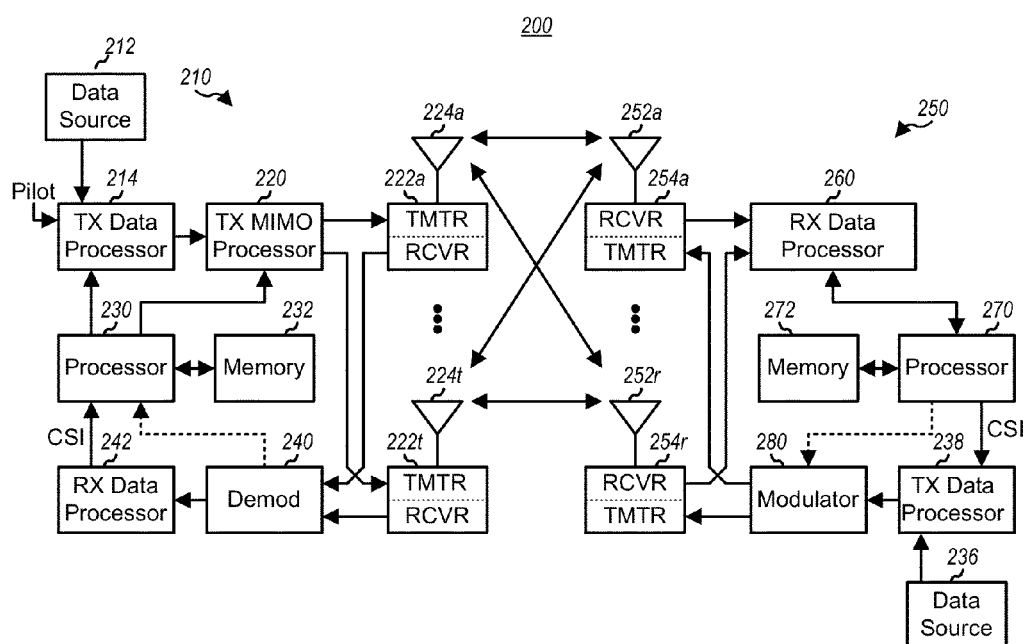
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
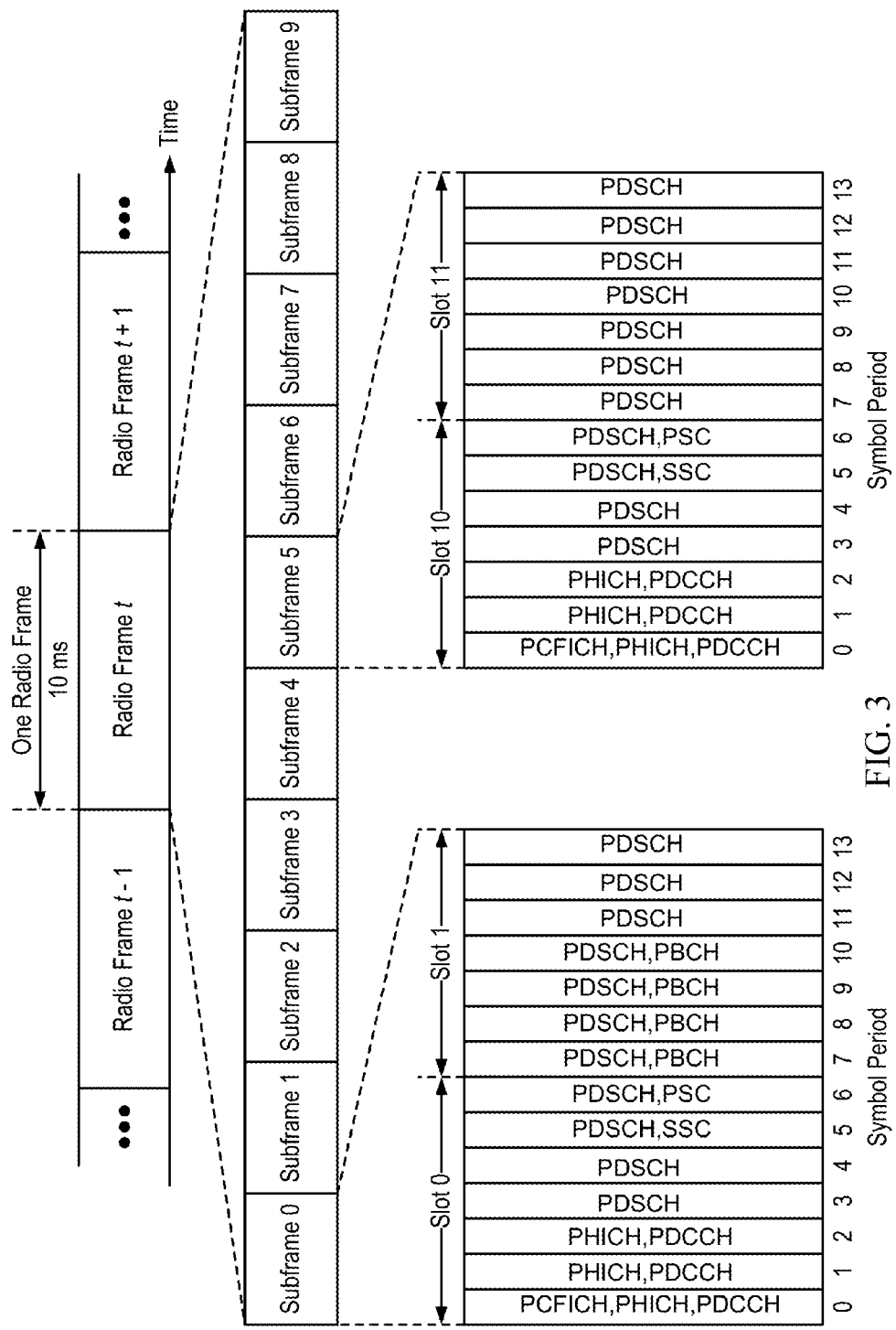
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
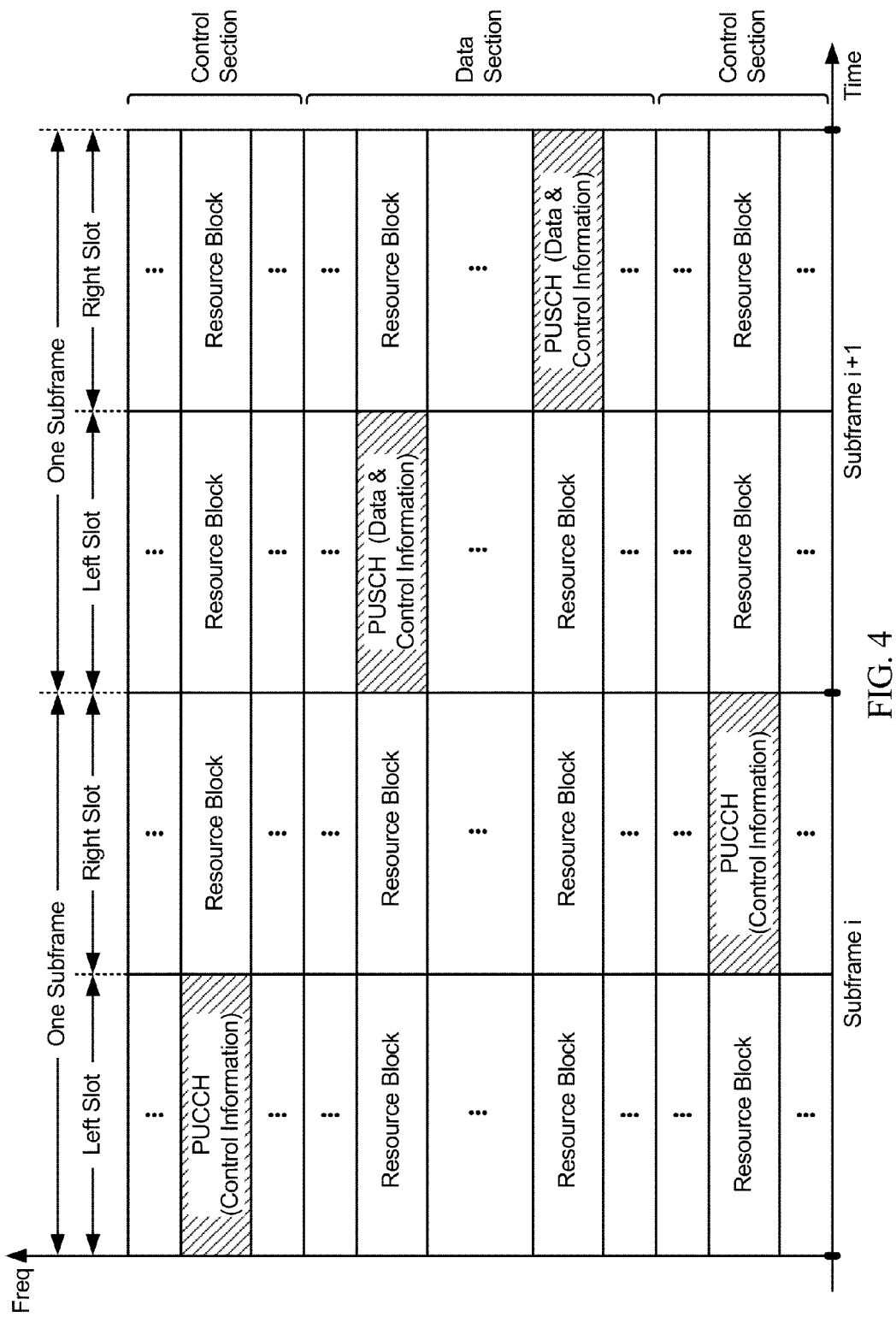
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
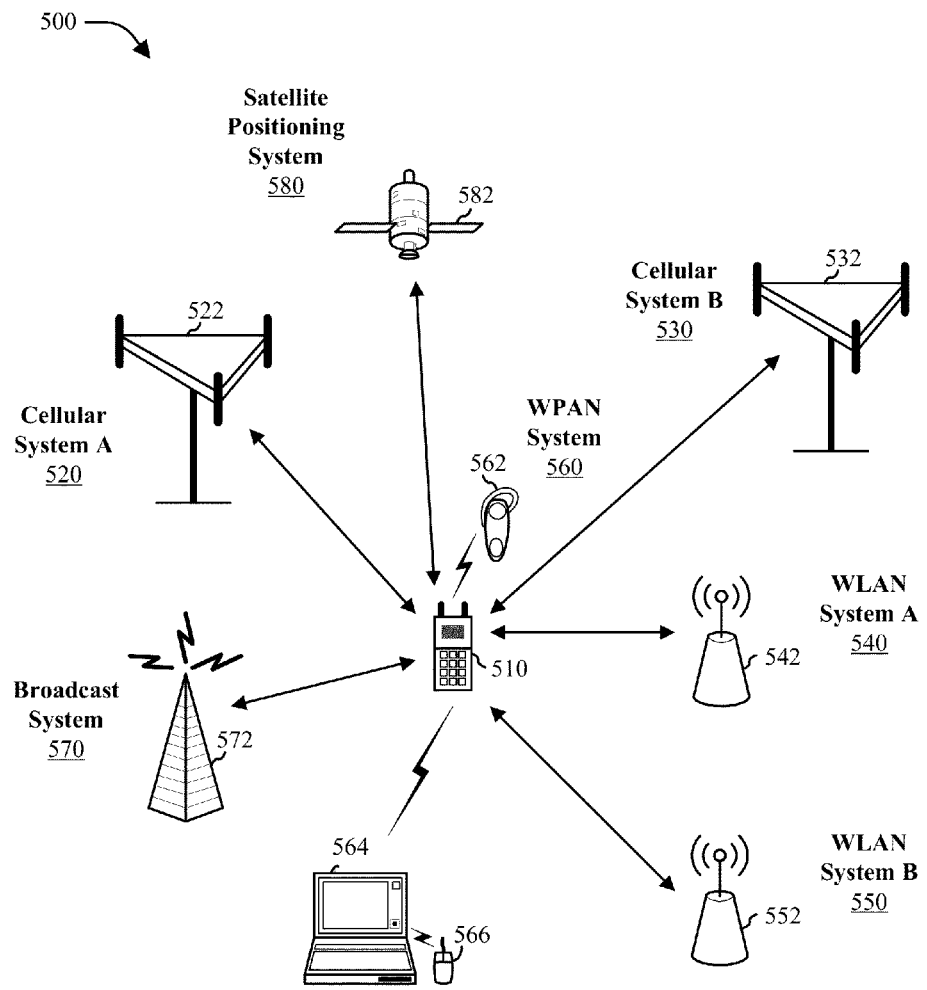
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "$3^{rd}$ Generation Partnership Project" (3GPP). cdma2000 and UMB are described in documents from an organization named "$3^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
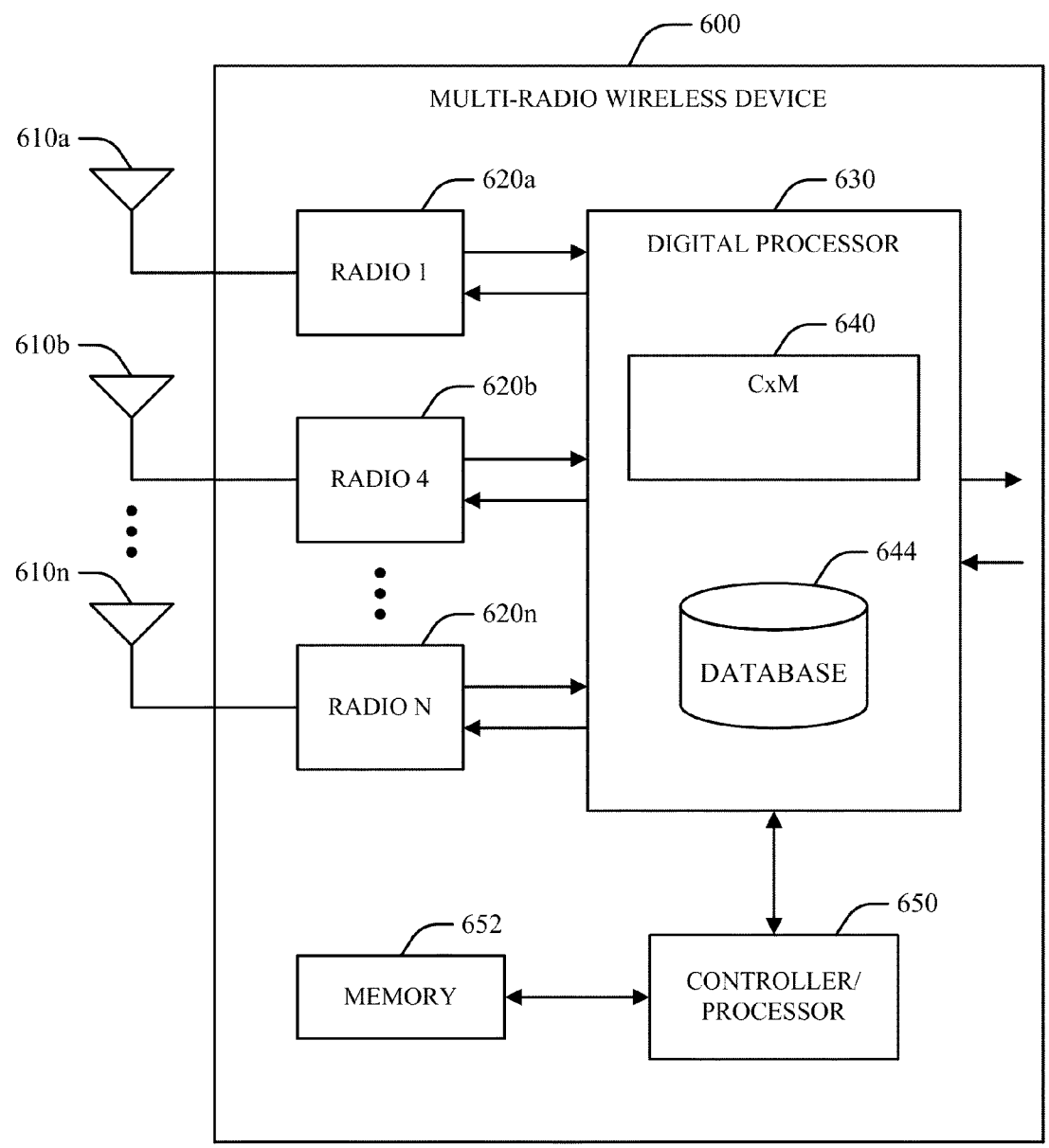
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (CxM) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
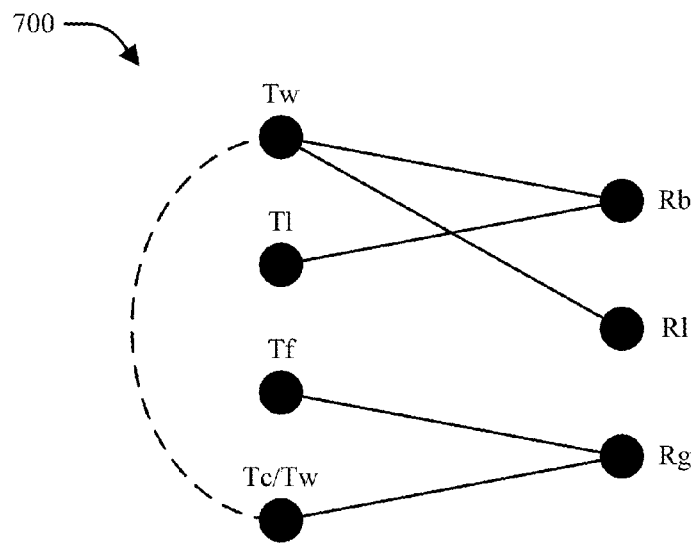
FIG. 7 is graph showing respective potential collisions between seven example radios in a given decision period.

In an aspect, the coexistence manager 640 can manage operation of respective radios 620 utilized by wireless device 600 in order to avoid interference and/or other performance degradation associated with collisions between respective radios 620. Coexistence manager 640 may perform one or more processes, such as those illustrated in FIG. 16. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
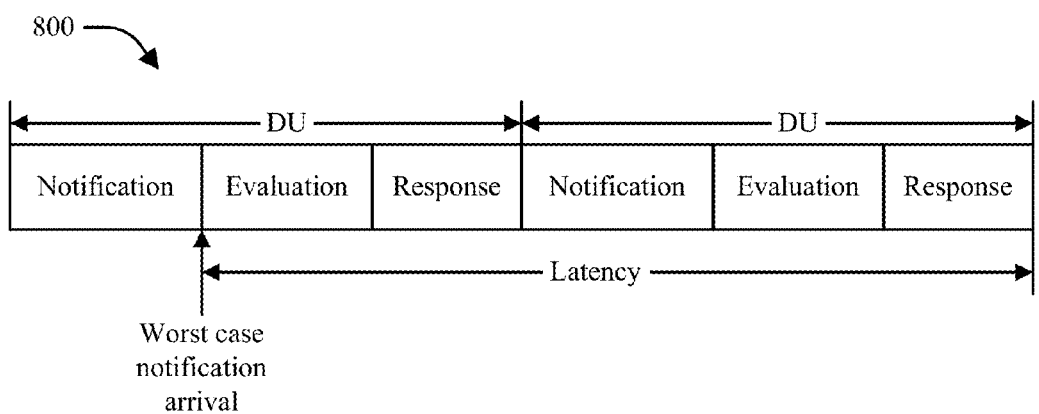
FIG. 8 is a diagram showing operation of an example Coexistence Manager (CxM) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
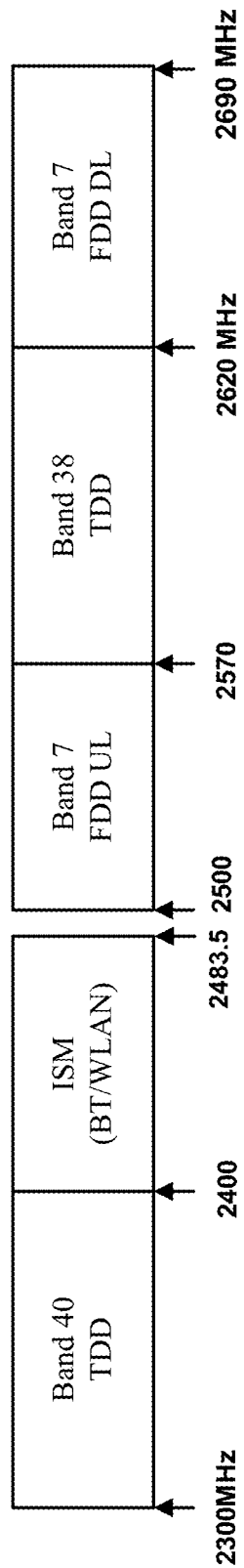
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
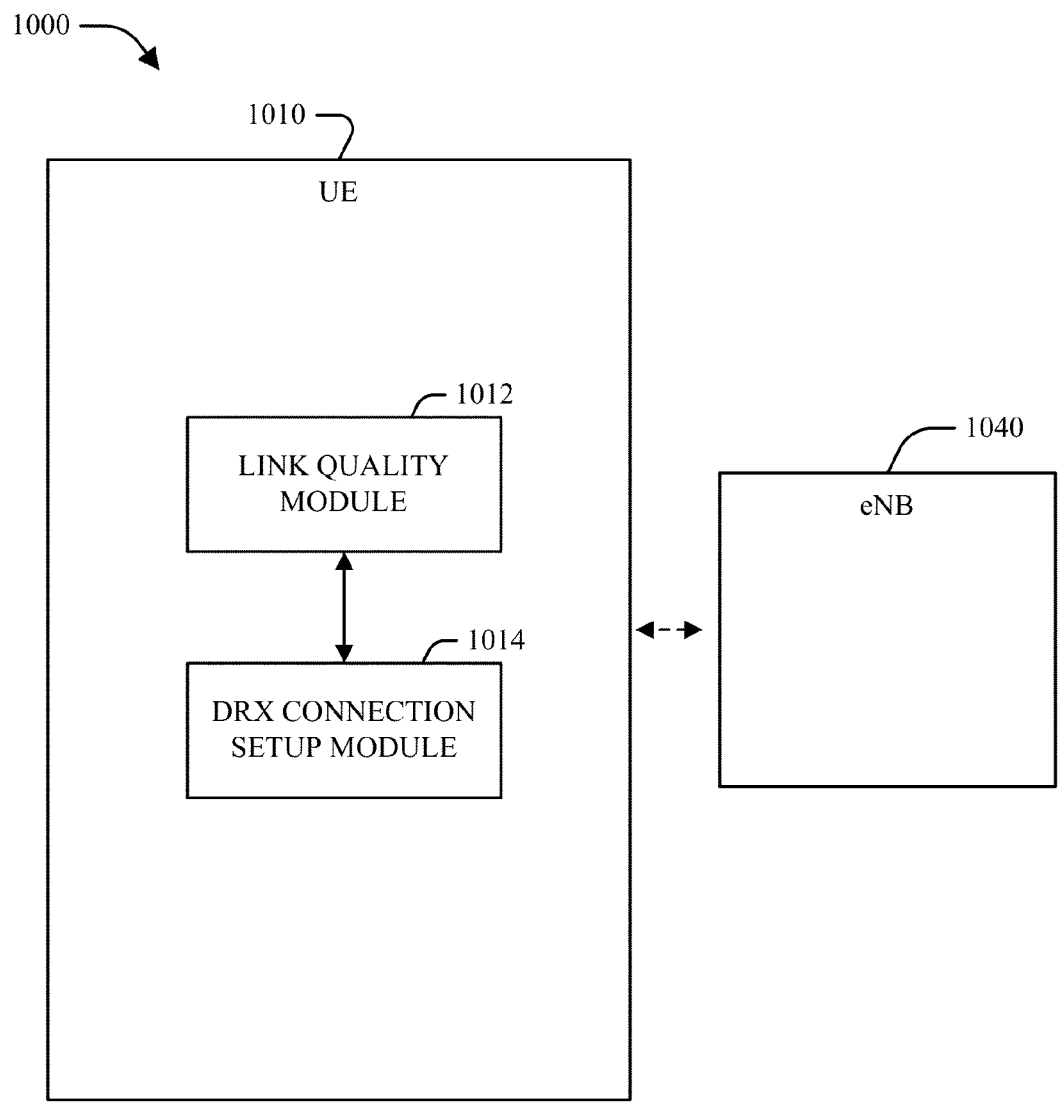
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a channel monitoring module 1012 and a discontinuous reception (DRX) connection setup module 1014. The channel monitoring module 1012 monitors potential interference from available RAT technologies. The DRX connection setup module 1014 assists with DRX based mechanisms for connection setup, as detailed below. The various modules 1012-1014 may, in some examples, be implemented as part of a coexistence manager such as the coexistence manager 640 of FIG. 6. The various modules 1012-1014 and others may be configured to implement the embodiments discussed herein.

DRX Based Mechanisms for Connection Setup

In a device with Bluetooth (BT) functionality, an inquiry transmission may be used to discover new Bluetooth devices. That is, a master Bluetooth device may use an inquiry transmission to discover a slave Bluetooth device. The inquiry may be user initiated or periodic. The inquiry may be referred to as a device discovery. During an inquiry, an inquiry train comprising a series of identification (ID) packets may be transmitted at different frequencies. In the present disclosure the master Bluetooth device may be referred to as a master device and the slave Bluetooth device may be referred to as a slave device.

The inquiry train uses thirty two frequencies and may be divided into two trains; Train A and Train B so that each train includes sixteen frequencies. The transmission time for each train is 10 milliseconds (ms) and the transmission for each train may be repeated 256 times. That is, each train is transmitted for a duration of 2.56 seconds. A slave device scans for a duration of 11.25 ms at a specific frequency. The scanning phase of the slave device is unknown to the master device.

The slave device may initiate another scan after 2.56 seconds at a subsequent frequency if the slave device does not receive the ID packet of the inquiry train. Furthermore, to improve the chance of the slave receiving the ID packets in one of the trains, the master device may modify the frequencies of each train after each 2.56 s transmission duration. The process of modifying the frequencies of each train may be referred to as morphing. Typically, each device discovery process lasts for 10.24 s.

The slave device responds by transmitting a frequency hopping synchronization (FHS) packet 625 microseconds (μs) after receiving the ID packet from the inquiry train when the result of an inquiry scan is successful. The slave device may also transmit an extended inquiry response (EIR) packet 1250 is after the initiating the transmission of the frequency hopping synchronization packet. The extended inquiry response packet can be up to 5 slots in duration. The transmission of the frequency hopping synchronization packet and the extended inquiry response packet may be referred to as a slave scan response.

After transmitting the extended inquiry response packet, the slave device applies a random backoff before beginning a subsequent scanning interval. For the random backoff, the slave device may select a random number between 0 to 1023. The random backoff is equal to the selected random number. That is, the number of time slots skipped before beginning a subsequent scanning interval is equal to the selected random number. Moreover, the random backoff has a duration between 0 and 640 ms depending on the number of slots. The slave device applies a random backoff after each successful inquiry scan. The master device does not know when the slave device will begin a subsequent scan.

Figure 11:
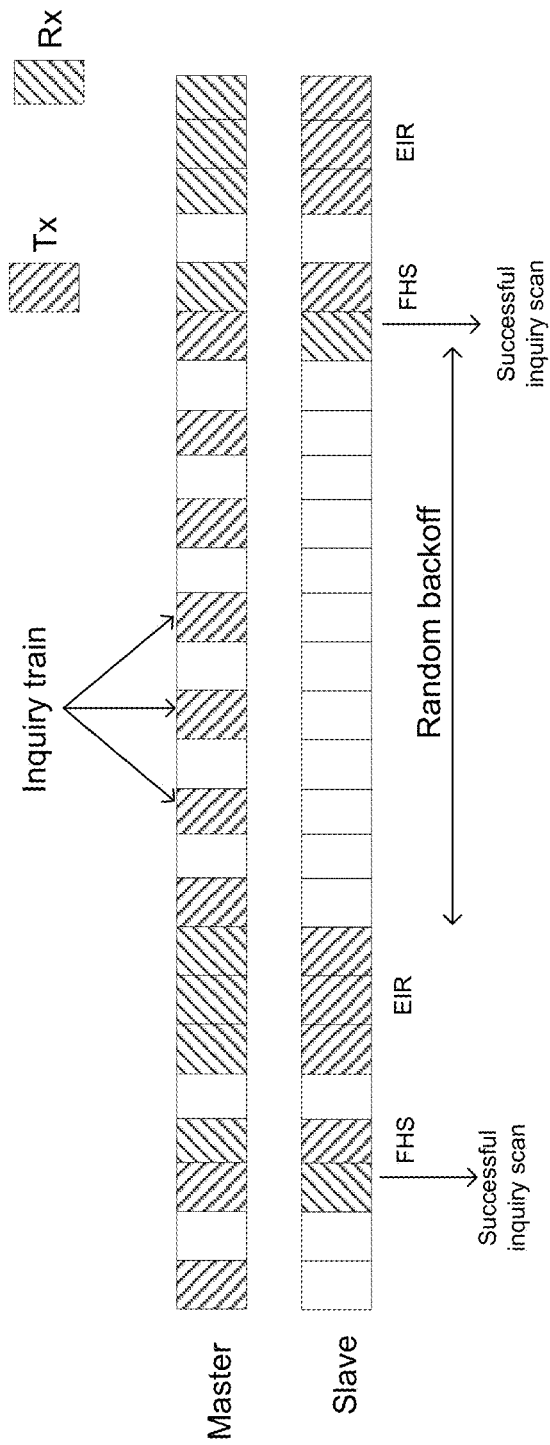
FIG. 11 is a diagram illustrating a Bluetooth device discovery sequence.

FIG. 11 illustrates a timeline of a typical device discovery between a master device and a slave device. As illustrated in FIG. 11 the master device may transmit inquiry trains at specific time slots. Furthermore, the slave device may transmit a frequency hopping synchronization packet after receiving a successful inquiry scan. After transmitting the frequency hopping synchronization, the slave device transmits an extended inquiry response packet. As illustrated in FIG. 11, the extended inquiry response packet uses three time slots. As previously discussed the extended inquiry response packet may use up to five time slots.

After transmitting the extended inquiry response packet, the slave device applies a random backoff before beginning a subsequent scanning interval. The master device may transmit inquiry trains while the slave device is in the random backoff period. Finally, the scanning phase of the slave device resumes after the random backoff.

In some cases, a master device may also transmit a paging train to establish a connection with the slave device. The transmission of the paging train may be similar to inquiry train transmission. In contrast to the inquiry trains, the paging trains are repeated for 1.28 seconds before switching to the other train. The slave device also performs a paging scan similar to an inquiry scan. In contrast to the inquiry scan, once a paging scan is successful, a paging response is initiated so that the master device and slave device may exchange packets before initializing a link manager protocol (LMP) message exchange for establishing the connection.

In some cases, a master device may include an in-device RAT in addition to the Bluetooth radio. Accordingly, transmission by the in-device RAT may potentially interfere with the reception of the Bluetooth radio or other RAT defined within the master device. For example, an LTE radio operating on bands 7 or 40 may potentially interfere with the Bluetooth radio's reception of the slave scan response.

Figure 12:
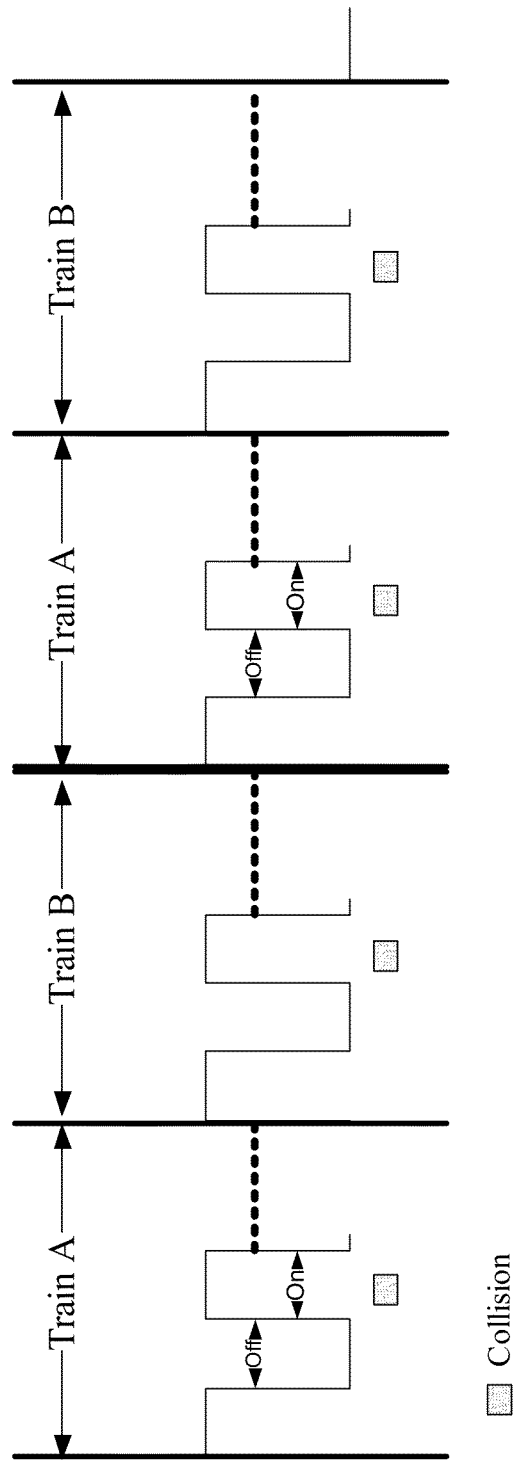
FIG. 12 is a diagram illustrating a prior art discontinuous reception scheme.

Gap patterns may be used to mitigate the interference when the Bluetooth radio is receiving a slave scan response. The gap pattern may be referred a discontinuous reception (DRX) pattern. FIG. 12 illustrates an example of type a typical discontinuous reception pattern.

As illustrated in FIG. 12, a discontinuous reception pattern creates on and off periods for RAT activity. On periods may be periods when a second RAT, such as a LTE radio, transmits signals, and the off periods may be periods when the second RAT receives a transmission or does not perform a transmission/reception. Because the slave device scanning is a periodic event (e.g., 11.25 ms every 1.28 or 2.56 seconds), the slave scan response may overlap (e.g., collide) with an on period. That is, the transmissions on one RAT in the master during the on period may interfere with the master device's reception of the slave scan response. Proposed are aspects for mitigating potential interference (e.g., collisions) between the reception of a message transmitted from a remote RAT of a remote device, such as a slave scan response, and transmissions of an in-device RAT.

According to an aspect of the present disclosure, to mitigate potential collisions the discontinuous reception pattern may be flipped after completion of the Train A and Train B transmissions. That is, the on/off pattern of a first discontinuous reception phase may be flipped to an off/on pattern in a subsequent discontinuous reception phase.

Figure 13:
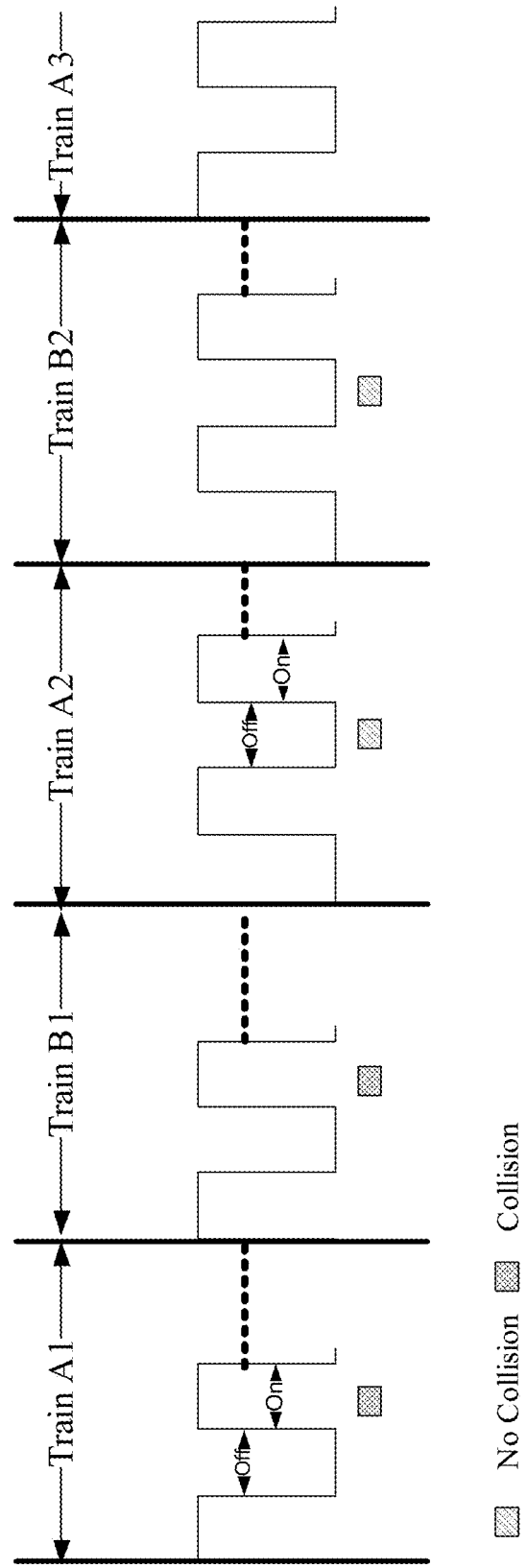
FIGS. 13-16 are diagrams illustrating discontinuous reception schemes according to aspects of the present disclosure.

Accordingly, if the reception of the slave scan response collides with an on period of a discontinuous reception pattern during a first discontinuous reception phase, the flipping of the on/off pattern may mitigate the collision in a second discontinuous reception phase. FIG. 13 illustrates an example of flipping a discontinuous reception pattern according to one aspect.

As illustrated in FIG. 13, during a first discontinuous reception phase (Train A1 and Train B1), the on period collides with the slave scan response. In the subsequent discontinuous reception phase (Train A2 and Train B2) the on/off pattern is flipped to an off/on pattern. Thereafter, the slave scan response does not collide with the on period and is aligned with the off period. That is, the potential collision is mitigated because the reception of the slave scan response occurs when the transmission of the in-device RAT is off.

Figure 14:
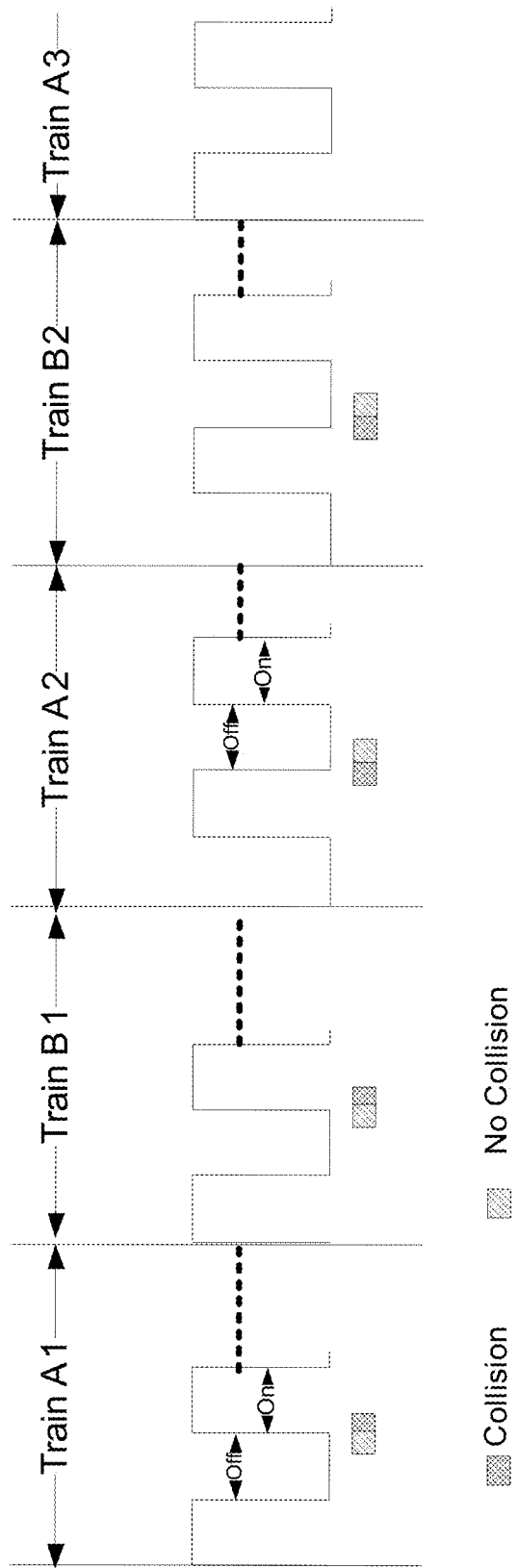

Still, in some cases, the reception of the slave scan response may occur during a transition from an on period to an off period, or vice versa. Accordingly, there may be a potential collision at the portion of the slave scan response that overlaps with the on period. FIG. 14 illustrates an example of a partial collision.

As illustrated in FIG. 14, during a first discontinuous reception phase (Train A1 and Train B1), the slave scan response is received during a transition from an off period to an on period of a discontinuous reception pattern. Specifically, the on period of the first discontinuous reception phase collides with the slave scan response. Furthermore, in the subsequent discontinuous reception phase (Train A2 and Train B2), the on/off pattern is flipped to an off/on pattern. Accordingly, in the subsequent discontinuous reception phase the slave scan response is received during a transition from an on period to an off period, and therefore, the on period collides with the slave scan response.

Figure 15:
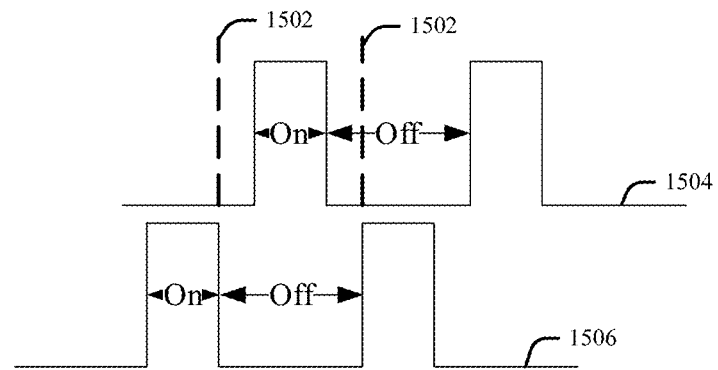

According to an aspect of the present disclosure, to mitigate a potential collision during an on/off or an off/on transition, a guard period may be added between the on period and the off period to specify that the flipped discontinuous reception pattern does not align with the original discontinuous reception pattern. FIG. 15 illustrates the flipped discontinuous reception pattern with a guard period according to an aspect of the present disclosure.

As illustrated in FIG. 15, guard periods 1502 may be added before and after an on period in an original discontinuous reception pattern 1504. The guard periods may extend the off period. Accordingly, when the original discontinuous reception pattern 1504 is flipped, the on/off periods of the flipped discontinuous reception pattern 1506 do not overlap the on/off periods of the original discontinuous reception pattern 1504. That is, without the guard periods 1502, the on period of the flipped discontinuous reception pattern 1506 would align with the off period of the original discontinuous reception pattern 1504. Accordingly, with the addition of the guard periods 1502, as illustrated in FIG. 15, the off period of the flipped discontinuous reception pattern 1506 does not fully align with the original discontinuous reception pattern 1504, and vice versa.

Therefore, when the reception of slave scan response is aligned with an on/off or off/on transition of an original DRX pattern 1504, the potential collision may be mitigated in the flipped DRX pattern 1506 because a on/off and off/on transition of the flipped DRX pattern 1506 is not aligned with an on/off and off/on transition of the original DRX pattern 1504. Similarly, if the reception of slave scan response is aligned with an on/off or off/on transition of a flipped DRX pattern 1506, the potential collision may be mitigated in the original DRX pattern 1504.

The addition of guard periods, such as guard periods 1502, may be added to a discontinuous reception pattern that is not flipped in subsequent discontinuous reception phases. Furthermore, the guard period may be a predetermined value. That is, the time for the off period may a sum of the on period and a predetermined value. For example, the predetermined value may be an integer multiple of the slave scan period. In some aspects, the time of the on period may also be modified. That is in addition to adding a guard period to the of period, the time of the on period may be decreased.

As previously discussed, after the slave device successfully scans an ID in a inquiry train, the slave device transmits an FHS packet and an EIR packet. The transmission of the FHS packet and the EIR packet is followed by a random backoff. In some cases, the transmission of the inquiry trains may be synced with the on period of a discontinuous reception pattern. That is, the periodic transmission of the inquiry train may be aligned with the on periods of a discontinuous reception pattern. As a result, the transmission of the slave scan response may also be synced with on period of the discontinuous reception pattern, and therefore, the master device may not properly receive the slave scan response.

According to another aspect of the present disclosure, to mitigate potential interference with the reception of the slave scan response, the periodic transmission of the inquiry train may be aligned with an off period of a discontinuous reception pattern. That is, the inquiry train is transmitted during the off periods of a discontinuous reception pattern. In some aspects, the inquiry train may only be transmitted during the off periods.

By specifying that the inquiry train is transmitted during an off period of the discontinuous reception pattern, the slave scan response may be received during an off period of the discontinuous reception pattern. Furthermore, according to some aspects, to mitigate a collision between the slave scan response and an on period, a guard period may be placed between the end of an inquiry train transmission and the beginning of an on period.

Figure 16:
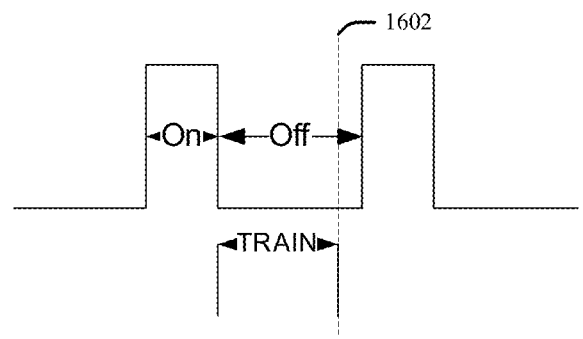

FIG. 16 illustrates an example of a transmission of an inquiry train according to an aspect of the present disclosure. As illustrated in FIG. 16, the inquiry train is transmitted during an off period of a discontinuous reception pattern. Furthermore, a guard period 1602 is placed after the transmission of the inquiry train so that the on period begins after the guard period. Because the guard period increases the duration of an off period, the guard period may improve the likelihood that the slave scan response is received during an off period.

According to another aspect, to mitigate a potential collision between an on period of a discontinuous reception pattern and the reception of a slave scan response, the coexistence manager may detect the slave scan phase and configure the discontinuous reception pattern according to the detected slave scan phase. That is, after the first slave response is received by the master device, the coexistence manager may detect the slave scan phase, and configure a new discontinuous reception pattern so that the reception of the slave scan response is aligned with an off period. The reconfigured discontinuous reception pattern may improve reception of the slave scan response. The discontinuous reception parameters may also improve the link manager protocol (LMP) message reception. The present aspect may be performed without the flipping of the discontinuous reception pattern.

According to still yet another aspect, to mitigate a potential collision between an on period of a discontinuous reception pattern and a slave scan transmission short term HARQ compliant TDM patterns may be used to mitigate interference during the reception of a slave scan. For example, a 2 ms on 2 ms off pattern may be used for a discontinuous reception pattern. The current aspect may be used in conjunction with the alignment of the inquiry train with the discontinuous reception pattern.

It should be noted that although the aspects of the present disclosure are presented to mitigate collisions between the reception of a Bluetooth message (e.g., slave scan response) and the transmissions of an in-device RAT (e.g., LTE radio), the aspects of the present disclosure are also contemplated to mitigate collisions between the reception of messages from other types of RATs and transmissions of other in-device RATs. That is, the aspects of the present disclosure are not limited to a Bluetooth radio, Bluetooth message, and LTE radios.

Figure 17A:
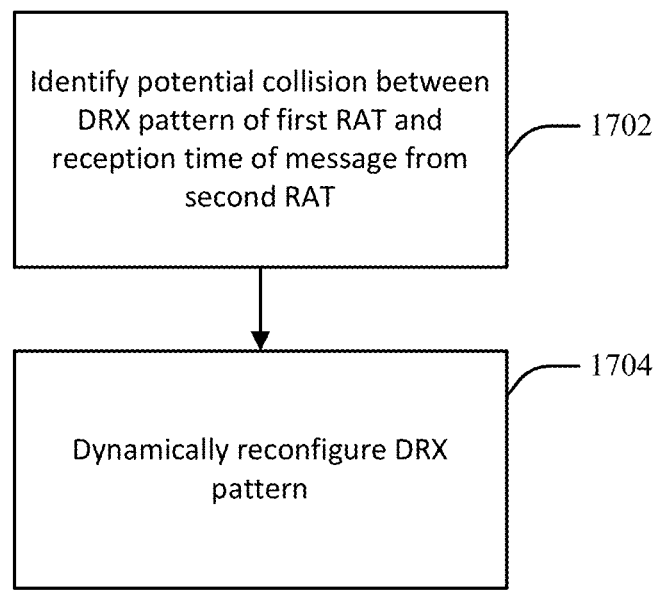
FIG. 17A is a block diagram illustrating discontinuous reception method according to one aspect of the present disclosure.
Figure 17B:
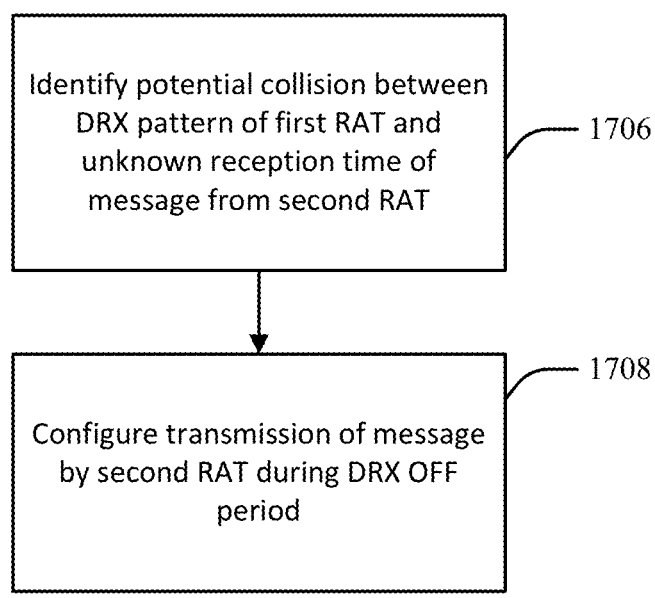
FIG. 17B is a block diagram illustrating discontinuous reception method according to one aspect of the present disclosure.

As shown in FIG. 17A a device such as a UE may identify a potential collision between a discontinuous reception (DRX) pattern of a first RAT and a reception time of a message from a second RAT of a remote device, as shown in block 1702. A UE may dynamically reconfigure the DRX pattern to reduce a likelihood of the potential collision, as shown in block 1704. As shown in FIG. 17B a device such as a UE may identify a potential collision between a discontinuous reception (DRX) pattern of a first RAT and an unknown reception time of a second message from a second RAT of a remote device, as shown in block 1706. The UE may configure transmission of a first message by the second RAT during a DRX OFF-period of the DRX pattern to reduce a likelihood of the potential collision, as shown in block 1708.

Figure 18:
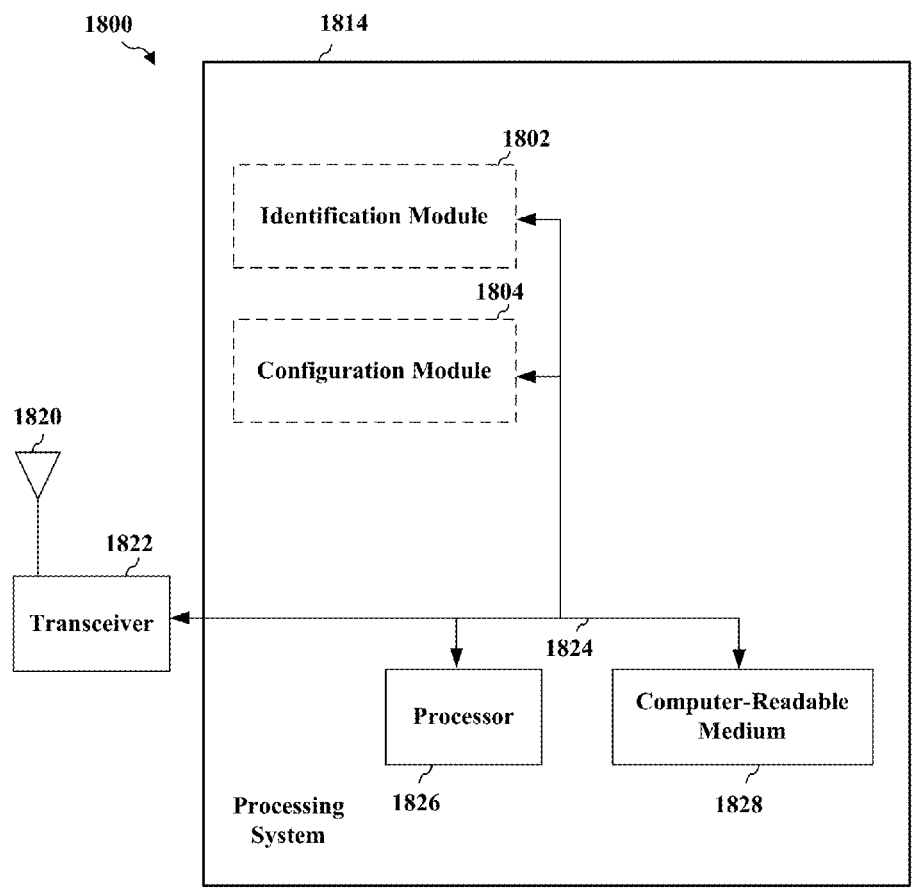
FIG. 18 is a diagram illustrating an example of a hardware implementation for an apparatus employing discontinuous reception method.

FIG. 18 is a diagram illustrating an example of a hardware implementation for an apparatus 1800 employing a processing system 1814. The processing system 1814 may be implemented with a bus architecture, represented generally by a bus 1824. The bus 1824 may include any number of interconnecting buses and bridges depending on the specific application of the processing system 1814 and the overall design constraints. The bus 1824 links together various circuits including one or more processors and/or hardware modules, represented by a processor 1826, an identification module 1802, a configuration module 1804, and a computer-readable medium 1828. The bus 1824 may also link various other circuits such as timing sources, peripherals, voltage regulators, and power management circuits, which are well known in the art, and therefore, will not be described any further.

The apparatus includes the processing system 1814 coupled to a transceiver 1822. The transceiver 1822 is coupled to one or more antennas 1820. The transceiver 1822 provides a means for communicating with various other apparatus over a transmission medium. The processing system 1814 includes the processor 1826 coupled to the computer-readable medium 1828. The processor 1826 is responsible for general processing, including the execution of software stored on the computer-readable medium 1828. The software, when executed by the processor 1826, causes the processing system 1814 to perform the various functions described supra for any particular apparatus. The computer-readable medium 1828 may also be used for storing data that is manipulated by the processor 1826 when executing software.

The processing system 1814 further includes the identification module 1802. The identification module 1802 may identify a potential collision between a discontinuous reception (DRX) pattern of a first RAT and a reception time of a message from a second RAT of a remote device. The reception time may be unknown. The processing system 1814 further includes the configuration module 1804. The configuration module 1804 may dynamically reconfigure the DRX pattern to reduce a likelihood of the potential collision. The configuration module 1804 may also configure transmission of a first message by the second RAT during a DRX OFF-period of the DRX pattern to reduce a likelihood of the potential collision. The identification module 1802 and the configuration module 1804 may be software modules running in the processor 1826, resident/stored in the computer readable medium 1828, one or more hardware modules coupled to the processor 1826, or some combination thereof. The processing system 1814 may be a component of the UE and may include the memory 272 and/or the processor 270.

In one configuration, the apparatus 1800 for wireless communication includes means for identifying. The means may be the identifying module 1802 and/or the processing system 1814 of the apparatus 1800 configured to perform the functions recited by the means. The means may include the memory 272, computer-readable medium 1828, processor 270/1826, antennae 252/610/1820, receiver 254, transceiver 1822, link quality module 1012, and/or coexistence manager 640.

In one configuration, the apparatus 1800 for wireless communication includes means for configuring. The means may be the configuring module 1804 and/or the processing system 1814 of the apparatus 1800 configured to perform the functions recited by the means. The means may include the memory 272, computer-readable medium 1828, processor 270/1826, DRX connection setup module 1012, and/or coexistence manager 640.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communication in a multi-radio device, the method comprising:
    identifying, at a user equipment (UE), a potential collision between a transmission at a first radio access technology (RAT) of the UE and a reception of a response message at a second RAT of the UE occurring during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
    dynamically reconfiguring, at the UE, a pattern of the active DRX pattern to reduce a likelihood of the potential collision when the UE identifies the potential collision.

2. The method of claim 1, in which the dynamic reconfiguring comprises flipping the active DRX pattern in a subsequent DRX phase.

3. The method of claim 1, in which the dynamic reconfiguring comprises shifting a phase of the active DRX pattern.

4. The method of claim 1 in which the dynamic reconfiguring comprises modifying at least one of a DRX ON-period or a DRX OFF-period of the active DRX pattern.

5. The method of claim 4, in which the modifying comprises setting the DRX OFF-period to a sum of the DRX ON-period and a predetermined value.

6. The method of claim 1, further comprising:
    detecting a reception time of the response message, and
    in which the dynamically reconfiguring is based at least in part on the detected reception time.

7. An apparatus for wireless communication, comprising:
    means for identifying, at a user equipment (UE), a potential collision between a transmission at a first radio access technology (RAT) of the UE and a reception of a response message at a second RAT of the UE occurring during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
    means for dynamically reconfiguring, at the UE, a pattern of the active DRX pattern to reduce a likelihood of the potential collision when the UE identifies the potential collision.

8. A computer program product for wireless communication in a wireless network, comprising:
    a non-transitory computer-readable medium having non-transitory program code recorded thereon, the program code comprising:
        program code to identify, at a user equipment (UE), a potential collision between a transmission at a first radio access technology (RAT) of the UE and a reception of a response message at a second RAT of the UE occurring during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
        program code to dynamically reconfigure, at the UE, a pattern of the active DRX pattern to reduce a likelihood of the potential collision when the UE identifies the potential collision.

9. A user equipment (UE), for wireless communication, comprising:
    a memory; and
    at least one processor coupled to the memory, the at least one processor being configured:
        to identify a potential collision between a transmission at a first radio access technology (RAT) of the UE and a reception of a response message at a second RAT of the UE occurring during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and to dynamically reconfigure a pattern of the active DRX pattern to reduce a likelihood of the potential collision when the UE identifies the potential collision.

10. The UE of claim 9, in which the at least one processor is further configured to flip the active DRX pattern in a subsequent DRX phase.

11. The UE of claim 9, in which the at least one processor is further configured to shift a phase of the active DRX pattern.

12. The UE of claim 9, in which the at least one processor is further configured to modify at least one of a DRX ON-period or a DRX OFF-period of the active DRX pattern.

13. The UE of claim 12, in which the at least one processor is further configured to set the DRX OFF-period to a sum of the DRX ON-period and a predetermined value.

14. The UE of claim 9, in which the at least one processor is further configured to:
detect a reception time of the response message, and
dynamically reconfigure the active DRX pattern based at least in part on the detected reception time.

15. A method for wireless communication a multi-radio device, comprising:
identifying, at a user equipment (UE), a potential collision between a transmission at a first radio access technology (RAT) of the UE and a reception of a response message at a second RAT of the UE during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
configuring a subsequent transmission of the inquiry message by the second RAT during a DRX OFF-period of the active DRX pattern to reduce a likelihood of the potential collision.

16. The method of claim 15, in which the inquiry message is a Bluetooth inquiry train.

17. The method of claim 15, further comprising allocating a guard time before a start of a DRX ON-period of the active DRX pattern.

18. The method of claim 15, in which the response message includes a frequency hopping synchronization (FHS) packet and an extended inquiry response (EIR) packet.

19. An apparatus for wireless communication, comprising:
means for identifying, at a user equipment (UE), a potential collision between a transmission at a first radio access technology (RAT) of the UE and a reception of a response message at a second RAT of the UE during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
means for configuring a subsequent transmission of the inquiry message by the second RAT during a DRX OFF-period of the active DRX pattern to reduce a likelihood of the potential collision.

20. A computer program product for wireless communication in a wireless network, comprising:
a non-transitory computer-readable medium having non-transitory program code recorded thereon, the program code comprising:
program code to identify, at a user equipment (UE), a potential collision between a transmission at a first radio access technology (RAT) of the UE and a reception of a response message at a second RAT of the UE during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
program code to configure a subsequent transmission of the inquiry message by the second RAT during a DRX OFF-period of the active DRX pattern to reduce a likelihood of the potential collision.

21. A user equipment (UE) for wireless communication, comprising:
a memory; and
at least one processor coupled to the memory, the at least one processor being configured:
to identify a potential collision between a transmission at a first radio access technology (RAT) of the UE and a reception of a response message at a second RAT of the UE during an ON-period of an active discontinuous reception (DRX) pattern of the first RAT, the response message being received in response to an inquiry message transmitted from the second RAT that is received during a reception phase of a third RAT that is remote to the UE, the reception phase being unknown prior to the reception of the response message; and
to configure a subsequent transmission of the inquiry message by the second RAT during a DRX OFF-period of the active DRX pattern to reduce a likelihood of the potential collision.

22. The UE of claim 21, in which the inquiry message is a Bluetooth inquiry train.

23. The UE of claim 21, in which the at least one processor is further configured to allocate a guard time before a start of a DRX ON-period of the active DRX pattern.

24. The UE of claim 21, in which the response message includes a frequency hopping synchronization (FHS) packet and an extended inquiry response (EIR) packet.

* * * * *